(12) United States Patent
Heinke et al.

(10) Patent No.: US 7,369,156 B1
(45) Date of Patent: May 6, 2008

(54) NONCONTACT TEMPERATURE MEASUREMENT DEVICE HAVING COMPRESSED VIDEO IMAGE TRANSFER

(75) Inventors: Thomas Heinke, Santa Cruz, CA (US); Frank W. Schneider, Scotts Valley, CA (US); Stefan H. Warnke, Santa Cruz, CA (US)

(73) Assignee: Raytek Corporation, Santa Cruz, CA (US)

( * ) Notice: Subject to any disclaimer, the term of this patent is extended or adjusted under 35 U.S.C. 154(b) by 163 days.

(21) Appl. No.: 11/128,117

(22) Filed: May 12, 2005

(51) Int. Cl.
H04N 7/18 (2006.01)
(52) U.S. Cl. .................. 348/143; 348/152; 340/870.07
(58) Field of Classification Search ................ 348/143, 348/152, 153; 340/870.07
See application file for complete search history.

(56) References Cited

U.S. PATENT DOCUMENTS

| | | | |
|---|---|---|---|
| 4,634,294 | A | 1/1987 | Christol et al. |
| 5,640,015 | A | 6/1997 | Kienitz et al. |
| 5,936,666 | A * | 8/1999 | Davis .......................... 348/143 |
| 6,234,669 | B1 | 5/2001 | Kienitz et al. |
| 2002/0030740 | A1* | 3/2002 | Arazi et al. .................. 348/143 |
| 2004/0008253 | A1* | 1/2004 | Monroe ....................... 348/143 |

OTHER PUBLICATIONS

Raytek, Inc. Application Brief: Thermoforming, Sep. 1993.
Raytek, Inc. Application Brief: Photographic Film Processing, Sep. 1993.
Evans, Sarah, "IR Thermometry Boosts Safety and Accuracy of HVAC Maintenance," Plant Engineering, Feb. 2000.
"IR Sensors Provide Tight Control in Drying Applications," *Textile World*, Aug. 1998.
Raytek Brochure, "Plastics Industries—Noncontact Temperature Measurement in Plastics Industries," Sep. 1998.
Raytek Brochure, "Applications—Raytek Infrared Thermometers: Indispensable Tools in Facility Maintenance," copyright date 2000.
Jose Ysaguirre, "Two-Color Thermometry Solutions," *Measurements & Control*, #180, Dec. 1996.
Raytek Brochure, "Applications—Raytek Infrared Thermometers: Maintaining Food Safety," Aug. 2000.
Raytek rochure, "Applications—Raytek Infrared Thermometers: Fast and Reliable Auto Diagnostics," copyright date 2000.
"IR Thermometers Now Help Manage Quality Control," Sensors, Nov. 1998.

* cited by examiner

Primary Examiner—Timothy Edwards, Jr.
(74) Attorney, Agent, or Firm—Nelson Mullins Riley & Scarborough LLP

(57) ABSTRACT

An apparatus for measuring temperature comprises a non-contact temperature measurement device situated at a first location. The device includes a sensor operative to collect radiant energy emanated from a target. Circuitry associated with the sensor produces a digital temperature signal containing temperature data regarding the target. A video camera produces a digital video signal containing video data of the target. A processor receives the digital temperature signal and the digital video signal and produces a combined digital signal for transmission to a second location. The combined digital signal contains both the temperature data and the video data. A computer situated at the second location receives the combined digital signal and separates the temperature data from the video data. Preferably, the computer includes a display having two windows on which the temperature data and the video data are respectively shown.

20 Claims, 5 Drawing Sheets

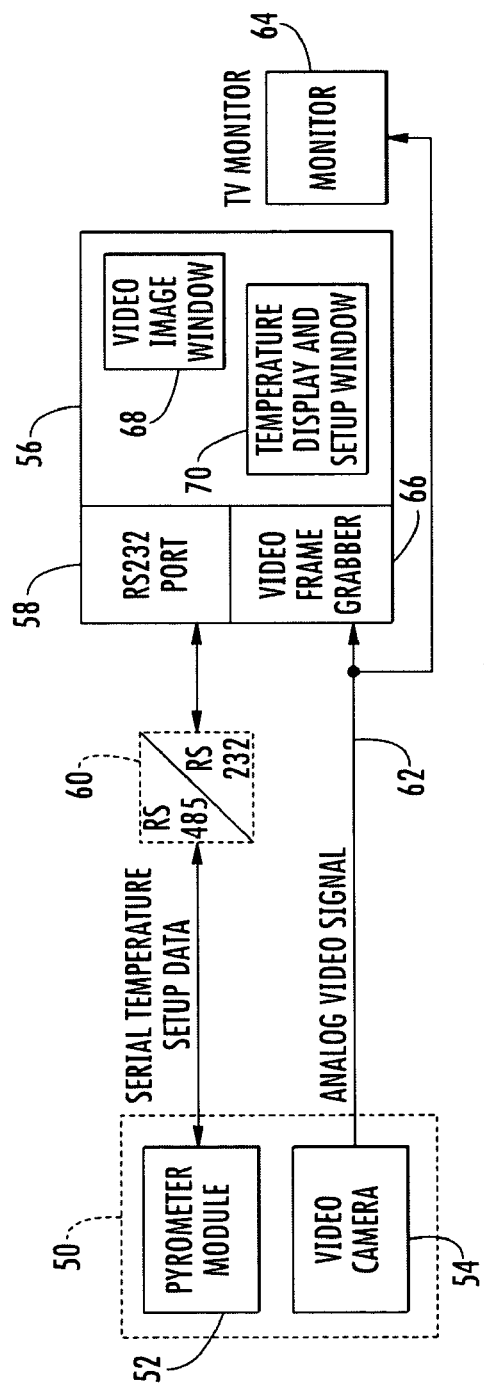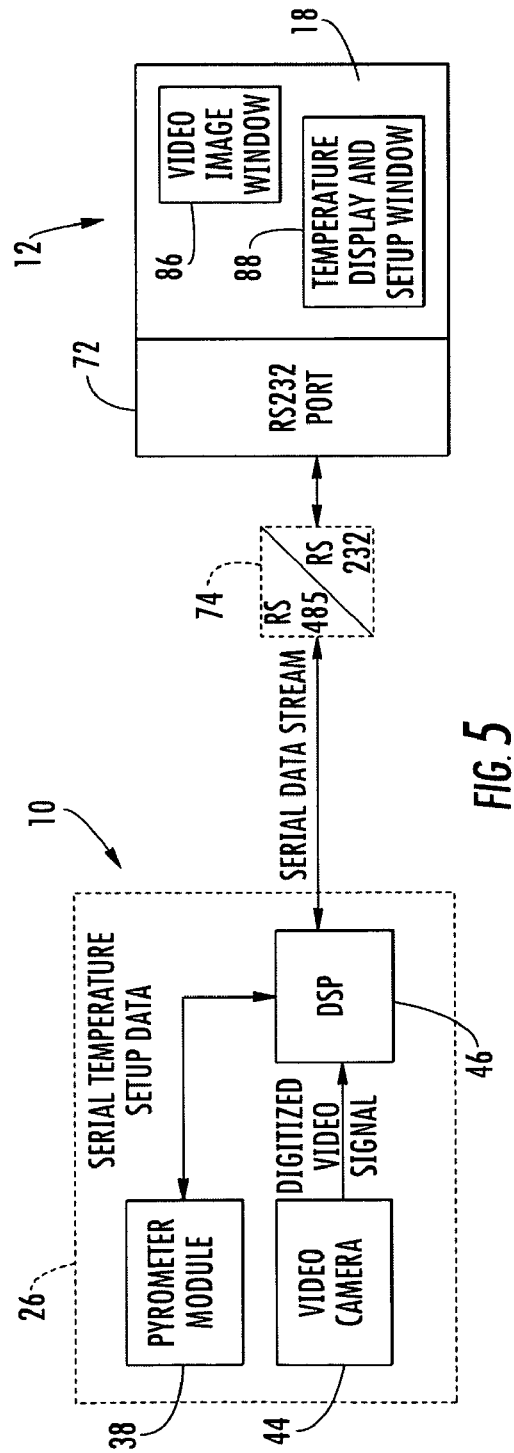

NONCONTACT TEMPERATURE MEASUREMENT DEVICE HAVING COMPRESSED VIDEO IMAGE TRANSFER

BACKGROUND OF THE INVENTION

The present invention relates generally to noncontact temperature measurement devices (pyrometers). More particularly, the invention relates to a pyrometer having a video sighting feature which transfers video and temperature data to a remote computer.

Pyrometers are used in a wide variety of applications. For example, handheld infrared (IR) pyrometers allow a user to ascertain the temperature of a target using a point and click technique. These devices are commonly utilized for purposes ranging from automotive diagnostics to food safety.

In other applications, it is desirable to use a stationary pyrometer having some local processing capability. The pyrometer in such cases will generally be connected to a remote computer with which it is in two-way digital communication. Typically, the two-way communication will be provided by common RS485 or RS232 protocols. Such an arrangement can be used, for example, in various process control environments.

Stationary pyrometers used for process control are sometimes equipped with a video camera to give the user visual information about the measured object. To transmit a real-time image to the remote computer, an extra cable is required for the video signal because the bandwidth of the standard (RS232/RS485) protocol is too small for video data.

SUMMARY OF THE INVENTION

According to one aspect, the present invention provides an apparatus for measuring temperature comprising a noncontact temperature measurement device situated at a first location. The device includes a sensor operative to collect radiant energy emanated from a target. Circuitry associated with the sensor produces a digital temperature signal containing temperature data regarding the target.

The device further includes a video camera operative to produce a digital video signal containing video data of the target. A processor receives the digital temperature signal and the digital video signal and produces a combined digital signal for transmission to a second location. The combined digital signal contains both the temperature data and the video data.

A computer situated at the second location receives the combined digital signal and separates the temperature data from the video data. Preferably, the computer includes a display having two windows on which the temperature data and the video data are respectively shown.

In some exemplary embodiments, the processor may be operative to compress the digital video signal into a compressed digital video signal (such as an MPEG data stream) before the combined digital signal is produced. Often, the compressed digital video signal and the digital temperature signal may be multiplexed to produce the combined digital signal.

Often, it will be desirable to transmit the combined digital signal to the second location as a serial data stream via RS485 transfer protocol. In such embodiments, the apparatus may further comprise an RS485/RS232 converter between the first and second locations. For example, the serial data stream may be transmitted to the second location via hard wired connection.

Other aspects of the present invention are provided by a method of transmitting temperature and video data from a first location to a remote second location. According to one step of the method, a noncontact temperature measurement device is utilized to produce a digital temperature signal containing temperature data regarding a selected target. Another method step utilizes a video camera to produce a digital video signal containing video data of the selected target. A further step of the method involves inputting the digital temperature signal and the digital video signal to a processor operative to produce a serial data stream containing the temperature data and the video data. Next, the serial data stream is transmitted to the remote second location. Software running on a personal computer at the remote second location is used according to another method step to process the serial data stream so as to separate the temperature data and the video data.

A still further aspect of the present invention provides a noncontact temperature measurement device for measuring temperature of a selected target. The device comprises a sensor operative to collect radiant energy emanated from the target. Circuitry associated with the sensor is operative to produce a digital temperature signal containing temperature data regarding the target. A video camera, operative to produce a digital video signal containing video data of the target, is also provided. The device also includes a processor operative to receive the digital temperature signal and the digital video signal and to produce a serial data stream containing the temperature data and the video data.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which:

FIG. 4 is a diagrammatic representation of a pyrometer having a video camera in accordance with the prior art;

FIG. 5 is a diagrammatic representation of a pyrometer having a video camera in accordance with the present invention;

Figure 1:
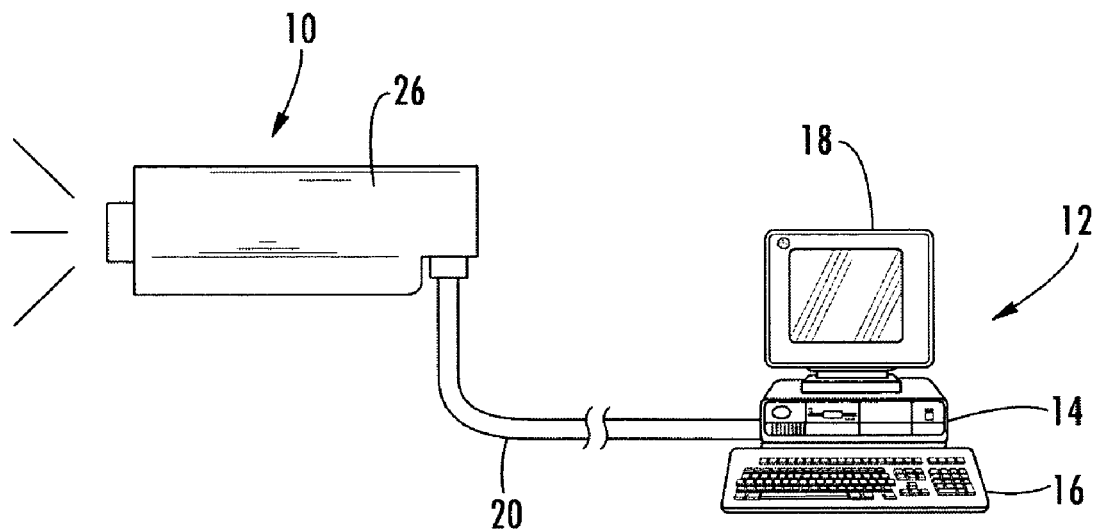
FIG. 1 shows a stationary pyrometer of the present invention connected to a personal computer for two-way communication therewith.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

FIG. 1 illustrates a pyrometer 10 situated at a first location to determine temperature of a selected target. Pyrometer 10 includes an internal detector which collects energy radiated from the target, as defined by the device's optics and location. The energy, typically in the form of infrared (IR) radiation, is isolated and focused on the detector. The detector converts the energy into an electrical signal which is then internally processed to yield a temperature value. In many embodiments, for example, pyrometer 10 will be situated to detect temperature fluctuations occurring in a manufacturing environment or other industrial process.

In the illustrated embodiment, pyrometer 10 is in electrical communication with a computer 12 situated at a second location. For example, computer 12 may be located in a control room of an industrial facility or other location remote from pyrometer 10. In this case, computer 12 is depicted as a standard desktop personal computer, having a processor housing 14, keyboard 16 and display 18. A user can monitor variations in the temperature of the industrial process by simply viewing the computer's display 18.

In addition, software running on computer 12 may be utilized to alter the configuration parameters of pyrometer 10. In this case, two-way communication between pyrometer 10 and computer 12 is provided by serial cable 20, although one skilled in the art will appreciate that wireless technology could also be utilized in some embodiments.

Figure 2:
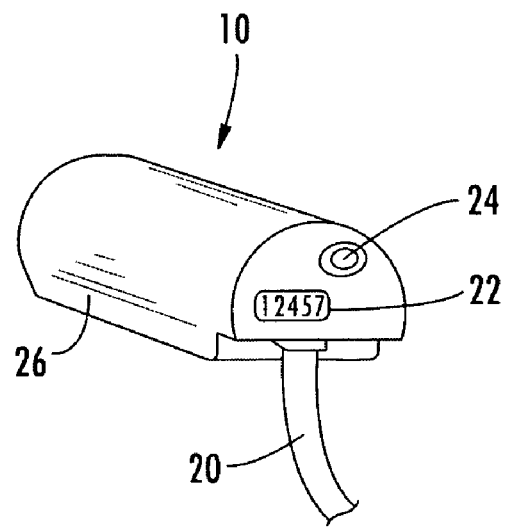
FIG. 2 is a rear perspective view of the pyrometer of FIG. 1.

Referring now to FIG. 2, it can be seen that the back surface of pyrometer 10 includes a temperature display 22. A view sight 24 is also located on the back surface of pyrometer 10 to facilitate aiming.

Certain internal components of pyrometer 10 can be most easily explained with reference to FIG. 3. As shown, pyrometer 10 includes a housing 26 in which various internal components are contained. In this case, for example, pyrometer 10 functions to collect radiation radiating from a target T located on a moving web 28. Energy from target T passes into housing 26 through a lens 30, which focuses the energy on a suitable detector 32. In this embodiment, the output of detector 32 is fed to an analog to digital (A/D) converter 34 before being fed to an internal microprocessor 36. Microprocessor 36 utilizes preprogrammed algorithms to convert the digital detector data into temperature information. Detector 32 along with its associated circuitry (A/D converter 34 and microprocessor 36) can be thought of collectively as a pyrometer module 38. In some embodiments, pyrometer module 38 may further include an ambient temperature sensor.

Figure 3:
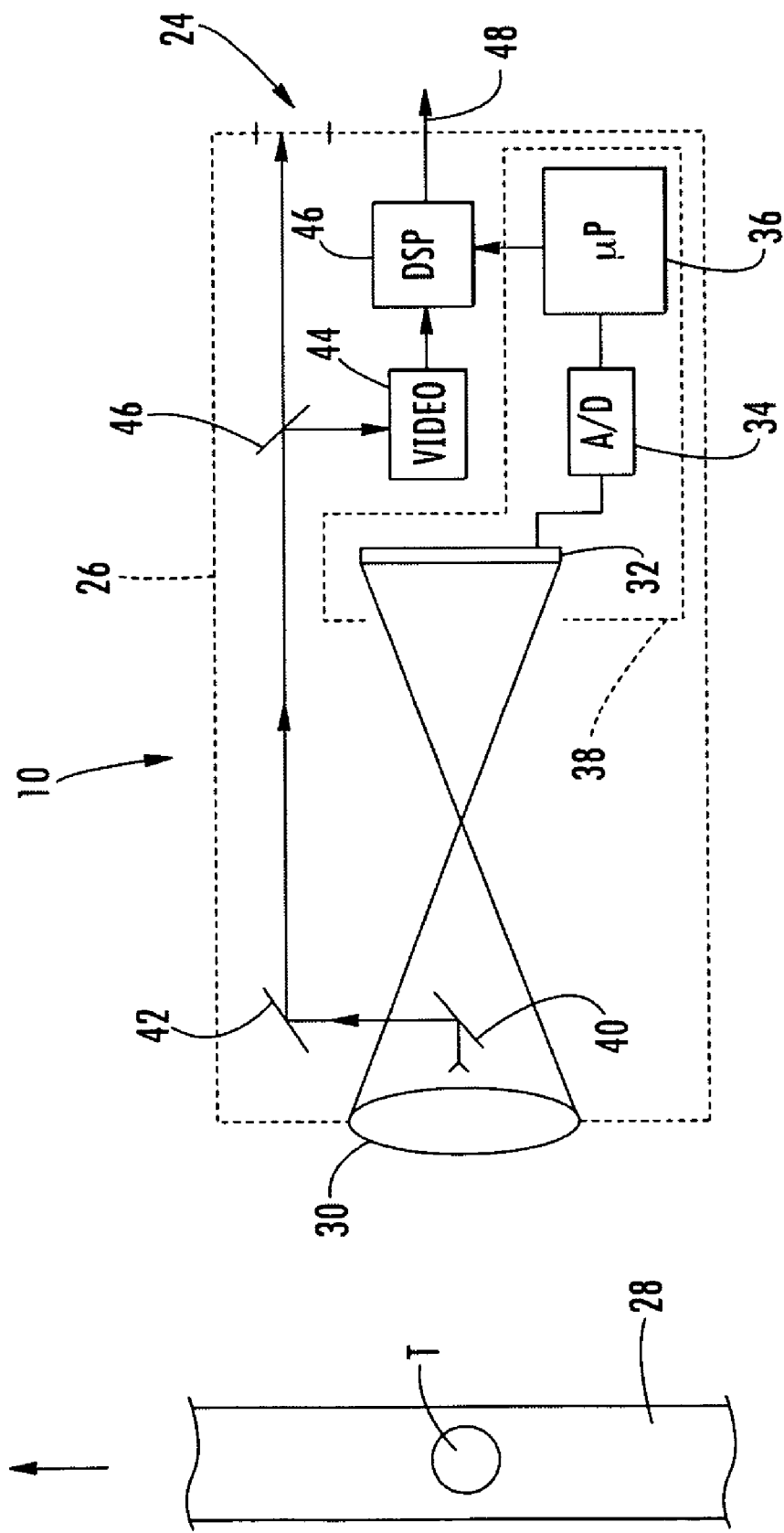
FIG. 3 is a diagrammatic representation showing internal components of the pyrometer of FIG. 1.

As also shown in FIG. 3, a portion of the visible light entering lens 30 is deflected by mirrors 40 and 42 to view sight 24. Pyrometer 10 is further equipped with an internal video camera 44 which collects video data for transmission to computer 12. In this case, a mirror 46 is used to divert to camera 44 a portion of the light that would otherwise pass through view sight 24. As will be explained in more detail below, a digital signal processor (DSP) 46 receives information from both microprocessor 36 and video camera 44 and produces a combined digital signal for output at 48.

Referring now to FIG. 4, a typical arrangement of the prior art is illustrated. In this case, a pyrometer 50 includes an internal pyrometer module 52 and video camera 54. A personal computer 56 at a second location is in electrical communication with pyrometer module 52 via serial cable. Temperature data and configuration information is transferred between pyrometer module 52 and computer 56 via the computer's RS232 port 58. A RS485 to RS232 (RS485/RS232) converter may optionally be utilized where the pyrometer is configured for RS485 protocol.

As shown, a video camera 54 produces an analog video signal which is sent along a separate video cable 62 to a TV monitor 64 or to an extra frame grabber 66 in computer 56. If frame grabber 66 is utilized, the computer's display can show a video image of the target in a first window 68, with the temperature display being located in a second window 70.

While the use of a separate video cable is often acceptable, it is undesirable in some cases. Thus, referring now to FIG. 5, the present invention provides both video and temperature data at a remote second location without the use of a separate video cable. As can be seen, DSP 46 is interposed between both pyrometer module 38 and video camera 44 on one side and the serial output of pyrometer 10 on the other.

In particular, DSP 46 receives the digital video signal containing video data from video camera 44. In addition, DSP 46 is in two-way communication with pyrometer module 38. In this regard, pyrometer module 38 provides a digital temperature signal containing temperature data to DSP 46, whereas DSP 46 can transfer various configuration data back to pyrometer module 38. In some embodiments, it may be desirable to configure DSP 46 to perform functions described above for microprocessor 36. In such cases, microprocessor 36 and DSP 46 can be combined as one device to which the output of A/D converter 34 is fed.

The resulting output of DSP 46 is a serial data stream containing both temperature and video data. In this case, the serial data stream is provided to the RS232 port 72 of computer 12. In cases where pyrometer 10 communicates via RS485 protocol, an RS485/RS232 converter 74 may be provided.

Figure 5A:
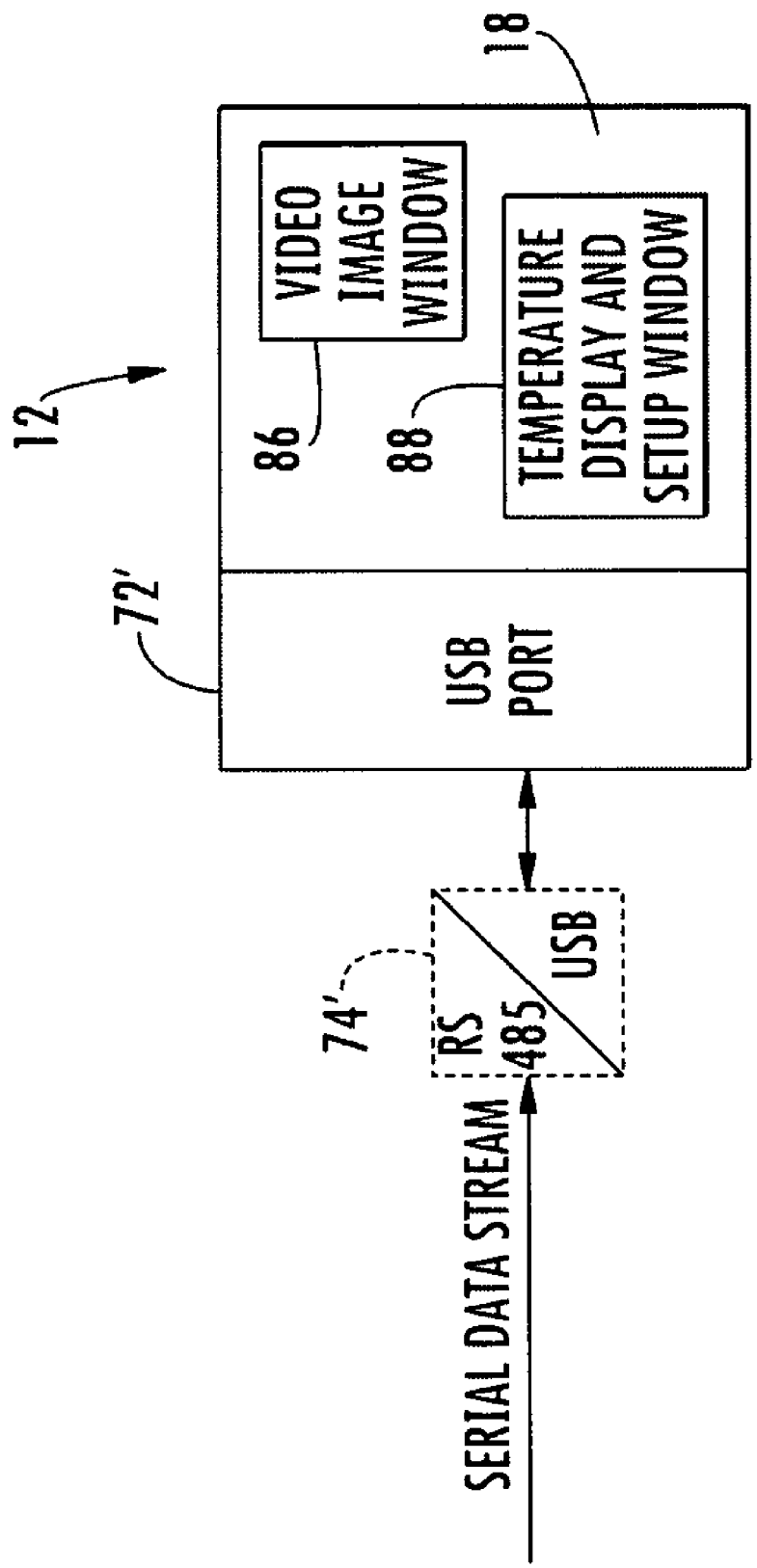
FIG. 5A is a diagrammatic representation showing the computer of FIG. 5 but with the USB port being used to receive the serial data stream.

FIG. 5A illustrates an alternative embodiment where the serial data stream is provided to a Universal Serial Bus (USB) port 72' on computer 12. In this case, the serial data stream is fed to an RS485/USB converter 74' as shown (one skilled in the art will appreciate that converter 74' may be a chain of an RS485/RS232 and an RS232/USB converter).

Figure 6:
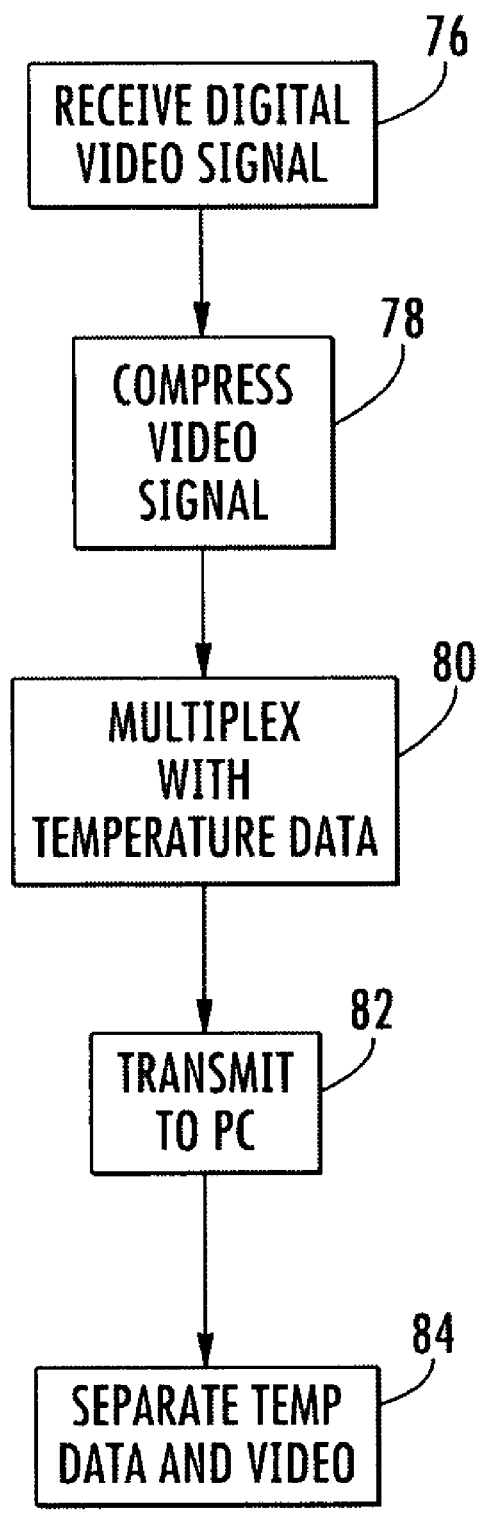
FIG. 6 is a flowchart showing the manner in which temperature and video data are combined in accordance with an embodiment of the present invention.

The operation of DSP 46 may be most easily explained with reference to FIG. 6. As indicated at step 76, DSP 46 receives the digital video signal from video camera 44. The video signal may then be compressed by DSP 46 into a suitable format, such as an MPEG data stream, as indicated at 78. The compressed video signal thus produced can then be multiplexed with the digital temperature signal (as indicated at 80) to produce a combined digital signal. The combined digital signal is then transmitted, such as by serial cable, to computer 12 (as indicated at 82). Software running on computer 12 is then utilized to separate the temperature and video data (as indicated at 84) for display in separate windows 86 and 88 of the computer's display 18 (FIG. 5).

It can thus be seen that the present invention provides a noncontact temperature measurement device providing a video image at a remote location without the need to provide a separate video cable. While preferred embodiments of the invention have been shown and described, modifications and variations may be made thereto by those of ordinary skill in the art without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to be limitative of the invention as further described in the appended claims.

What is claimed is:

1. An apparatus for measuring temperature, said apparatus comprising:

a noncontact temperature measurement device situated at a first location, said device including:
(a) a sensor operative to collect radiant energy emanated from a target;
(b) circuitry associated with said sensor, said circuitry operative to produce a digital temperature signal containing temperature data regarding said target;
(c) a video camera operative to produce a digital video signal containing video data of said target;
(d) a processor operative to receive said digital temperature signal and said digital video signal and to produce a combined digital signal for transmission to a second location, said combined digital signal containing said temperature data and said video data; and a computer situated at said second location, said computer operative to receive said combined digital signal and separate said temperature data from said video data.

2. An apparatus as set forth in claim 1, wherein said computer situated at said second location includes a display having two windows on which said temperature data and said video data is respectively shown.

3. An apparatus as set forth in claim 2, wherein said processor is operative to compress said digital video signal into a compressed digital video signal before said combined digital signal is produced.

4. An apparatus as set forth in claim 3, wherein said compressed digital video signal and said digital temperature signal are multiplexed to produce said combined digital signal.

5. An apparatus as set forth in claim 3, wherein said compressed digital video signal is an MPEG data stream.

6. An apparatus as set forth in claim 1, wherein said combined digital signal is transmitted to said second location as a serial data stream.

7. An apparatus as set forth in claim 6, wherein said serial data stream is transmitted to said second location via RS485 transfer protocol.

8. An apparatus as set forth in claim 7, further comprising an RS485/RS232 converter between said first location and said second location.

9. An apparatus as set forth in claim 7, further comprising an RS485/USB converter between said first location and said second location.

10. An apparatus as set forth in claim 6, wherein said serial data stream is transmitted to said second location via hard wired connection.

11. A method of transmitting temperature and video data from a first location to a remote second location, said method comprising steps of:
(a) using a noncontact temperature measurement device to produce a digital temperature signal containing temperature data regarding a selected target;
(b) using a video camera to produce a digital video signal containing video data of said selected target;
(c) inputting said digital temperature signal and said digital video signal to a processor operative to produce a serial data stream containing said temperature data and said video data;
(d) transmitting said serial data stream to said remote second location; and
(e) using software running on a personal computer at said remote second location to process said serial data stream so as to separate said temperature data and said video data.

12. A method as set forth in claim 11, further comprising the step of (f) displaying said temperature data and said video data.

13. A method as set forth in claim 12, wherein said temperature data and said video data are simultaneously displayed on a single display device of said personal computer.

14. A method as set forth in claim 13, wherein said temperature data and said video data are displayed on separate windows shown on said single display device.

15. A method as set forth in claim 11, wherein said processor is operative to compress said digital video signal into a compressed digital video signal before said serial data stream is produced.

16. A method as set forth in claim 15, wherein said compressed digital video signal and said digital temperature signal are multiplexed to produce said serial data stream.

17. A method as set forth in claim 16, wherein said compressed digital video signal is an MPEG data stream.

18. A method as set forth in claim 17, wherein said serial data stream is transmitted to said remote second location via RS485 transfer protocol.

19. A method as set forth in claim 18, wherein said serial data stream is transmitted to said second location via hard wired connection.

20. A noncontact temperature measurement device for measuring temperature of a selected target, said device comprising:

a sensor operative to collect radiant energy emanated from said target;

circuitry associated with said sensor, said circuitry operative to produce a digital temperature signal containing temperature data regarding said target;

a video camera operative to produce a digital video signal containing video data of said target; and a processor operative to receive said digital temperature signal and said digital video signal and to produce a serial data stream containing said temperature data and said video data.

* * * * *